United States Patent [19]

Shono

[11] Patent Number: 5,884,011

[45] Date of Patent: Mar. 16, 1999

[54] IMAGE PROCESSING APPARATUS AND METHOD

[75] Inventor: Seita Shono, Yokohama, Japan

[73] Assignee: Canon Kabushiki Kaisha, Tokyo, Japan

[21] Appl. No.: 716,635

[22] Filed: Sep. 13, 1996

[30] Foreign Application Priority Data

Sep. 20, 1995 [JP] Japan .................................. 7-241346

[51] Int. Cl.[6] .............................. G06F 15/00; H04N 1/00
[52] U.S. Cl. ......................... 395/106; 395/109; 358/443; 358/447; 358/448; 358/456; 358/459; 358/465
[58] Field of Search .................................. 395/106, 109, 395/112; 358/455, 456, 457, 459, 466, 443, 448, 447, 462, 464, 465, 534, 536; 382/254, 272, 267

[56] References Cited

U.S. PATENT DOCUMENTS

| | | | |
|---|---|---|---|
| 4,878,125 | 10/1989 | Katayama et al. | 358/456 |
| 5,121,447 | 6/1992 | Tanioka et al. | 358/466 |
| 5,153,925 | 10/1992 | Tanioka et al. | 358/466 |
| 5,315,415 | 5/1994 | Kawai et al. | 358/515 |
| 5,394,250 | 2/1995 | Shono | 358/455 |
| 5,436,736 | 7/1995 | Shono | 358/456 |

*Primary Examiner*—Edward L. Coles
*Assistant Examiner*—Mark Wallerson
*Attorney, Agent, or Firm*—Fitzpatrick, Cella, Harper & Scinto

[57] ABSTRACT

Adders (103, 104) add errors to multi-level image data whose number of bits is reduced by quantization units (101, 102), respectively. Weighted averaging units (120, 121) obtain the weighted average values of binary data of peripheral pixels which have already been divided, respectively. Comparators (107, 108) binarize, on the basis of the weighted average values, the image data output from the adders (103, 104) to obtain binary data corresponding to two pixels obtained upon dividing one pixel of the multi-level data into two pixels. Subtracters (105, 106) obtain the differences between the image data output from the adders (103, 104) and the weighted average values, respectively. Error arithmetic units (109, 110) obtain, on the basis of the differences, errors to be added by the adders (103, 104), respectively. Therefore, when one pixel of multi-level data is divided into two pixels of binary data, a binary image having a high resolution and high gradation can be generated at a low cost.

20 Claims, 8 Drawing Sheets

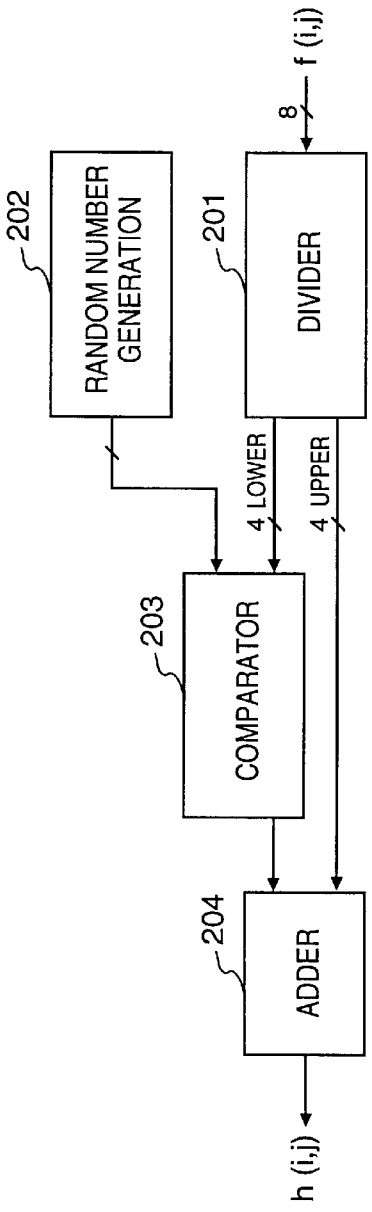
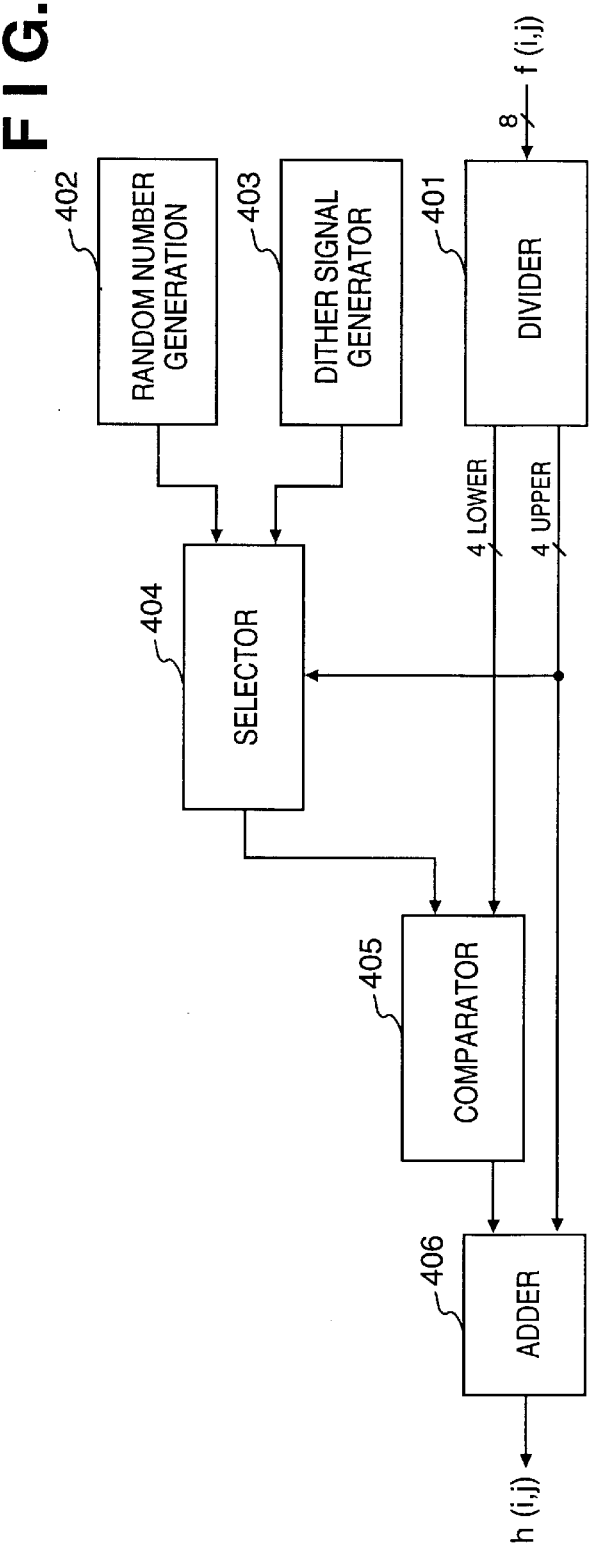

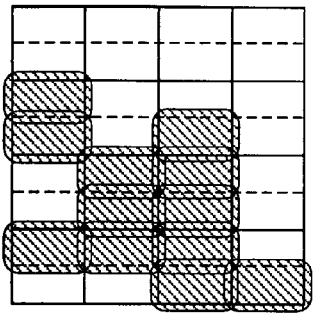

IMAGE PROCESSING APPARATUS AND METHOD

BACKGROUND OF THE INVENTION

1. Field of the Invention

The present invention relates to an image processing apparatus and method and, more particularly, to an image processing apparatus and method in which one pixel of input multi-level data is converted into a plurality of pixels of binary data and output.

2. Description of Related Art

In an image processing apparatus such as a dot printer for outputting binary data, jaggies appear in a character or an oblique line. To minimize the jaggies, an input pixel is converted (divided) into a plurality of pixels and output.

Of the plurality of converted pixels, pixels to be output as black pixels (significant pixels) are determined in accordance with a pattern which is recognized by pattern matching with a predetermined pattern including peripheral pixels and held in advance.

However, the above technique has the following problems. When the input image is a multi-level image, the number of predetermined patterns necessary for pattern matching is very large. Therefore, when one pixel of the input multi-level image is to be converted into a plurality of binary pixels, the processing time increases as compared to a case wherein a binary image is input. In addition, since the capacity of a memory for holding the large number of predetermined patterns increases, the cost increases accordingly.

SUMMARY OF THE INVENTION

The present invention has been made to solve the above problems, and has as its object to provide an image processing apparatus and method which can generate a satisfactory binary image having a high resolution and a high gradation at a low cost even when a multi-level image is input, and one pixel of the image is converted into a plurality of binary pixels.

In order to achieve the above object, according to a preferred embodiment of the present invention, there is provided an image processing apparatus comprising: input means for inputting multi-level image data; division means for dividing the input multi-level image data of one pixel into a plurality of multi-level data of the same level; first and second binarization means for converting the plurality of multi-level image data divided by the division means into binary data; and control means for controlling the first and second binarization means to parallelly execute conversion processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a block diagram showing the detailed arrangement of a quantization unit of the first embodiment;

FIG. 7 is a block diagram showing the detailed arrangement of a quantization unit of the second embodiment of the present invention;

FIGS. 8A to 8D are views for explaining processing in the first embodiment of the present invention;

DETAILED DESCRIPTION OF THE PREFERRED EMBODIMENTS

The embodiments of the present invention will be described below with reference to the accompanying drawings.

First Embodiment

[Arrangement]

Figure 1:
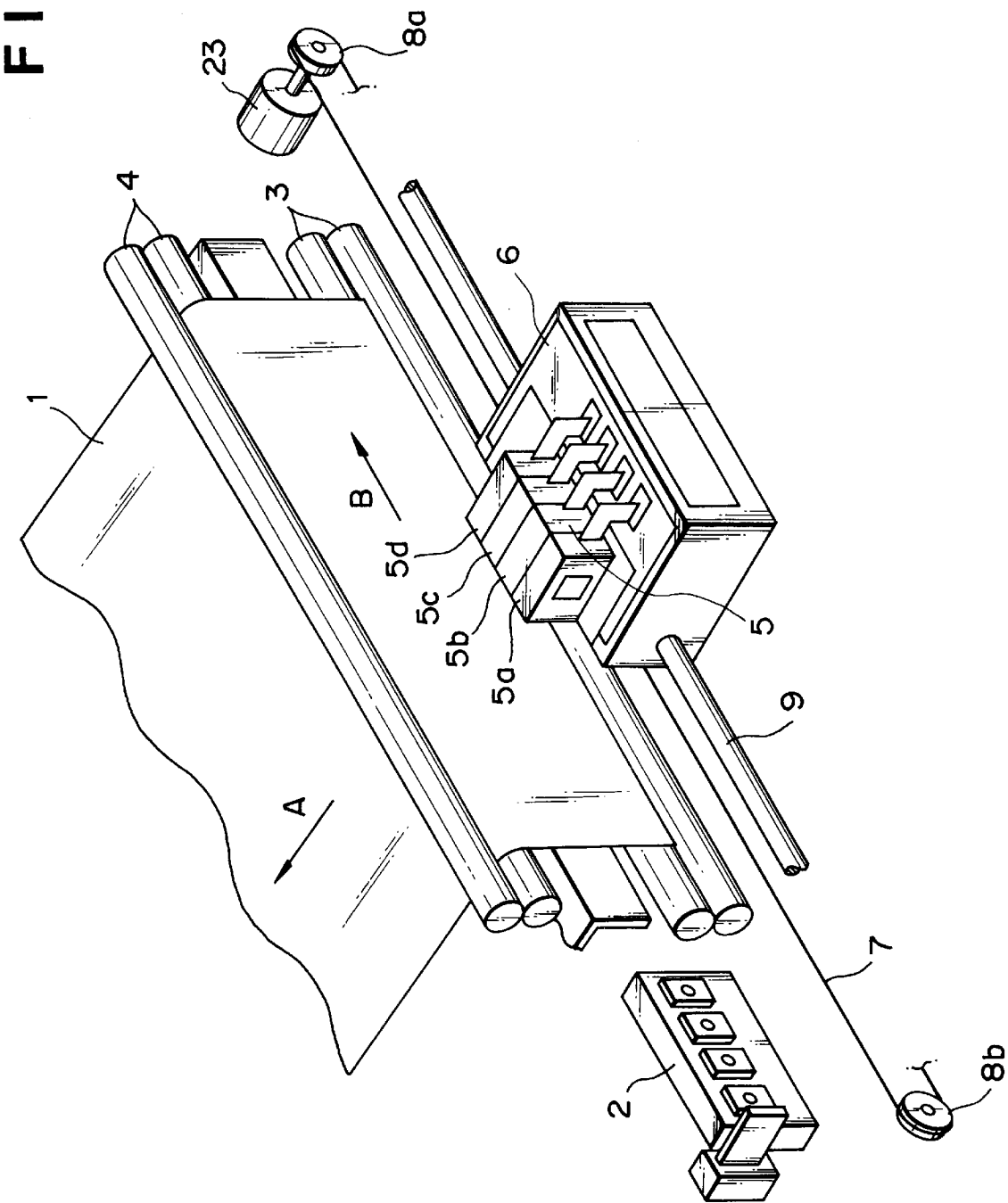
FIG. 1 is a perspective view of an ink-jet printing apparatus according to the first embodiment of the present invention.

FIG. 1 is a perspective view showing an ink-jet printing apparatus as an image processing apparatus of this embodiment.

The overall arrangement of this printing apparatus will be described first. Referring to FIG. 1, reference numeral 1 denotes a recording medium such as a paper sheet or a plastic sheet. A plurality of sheets 1 stacked on a cassette or the like are supplied one by one by a feeding roller (not shown). The supplied recording sheet is conveyed in a direction indicated by an arrow A by convey roller pairs 3 and 4 which are separated from each other by a predetermine distance and driven by different stepping motors (not shown).

An ink-jet type recording head 5 records an image on the recording sheet 1 and comprises heads 5a to 5d which discharge a Y (yellow) ink, an M (magenta) ink, a C (cyan) ink, and a Bk (black) ink, respectively. The inks are fed from an ink cartridge (not shown) to the nozzles of the corresponding heads and discharged in accordance with an image signal. The recording head 5 and the ink cartridge are mounted on a carriage 6. A carriage motor 23 is coupled to the carriage 6 through a belt 7 and pulleys 8a and 8b. That is, the carriage 6 is reciprocally scanned along a guide shaft 9 by driving the carriage motor 23.

With this arrangement, the recording head 5 discharges inks onto the recording sheet 1 in accordance with an image signal while moving in a direction indicated by an arrow B, thereby printing an ink image. The recording head 5 returns to the home position, as needed. Clogging in the nozzles is solved by an ink recovery unit 2. At the same time, the convey roller pairs 3 and 4 are driven to convey the recording sheet 1 by one line in the direction indicated by the arrow A.

By repeating the above operation, a predetermined image is recorded on the recording sheet 1.

[Control System]

A control system for driving the respective members of the recording apparatus will be described below.

Figure 2:
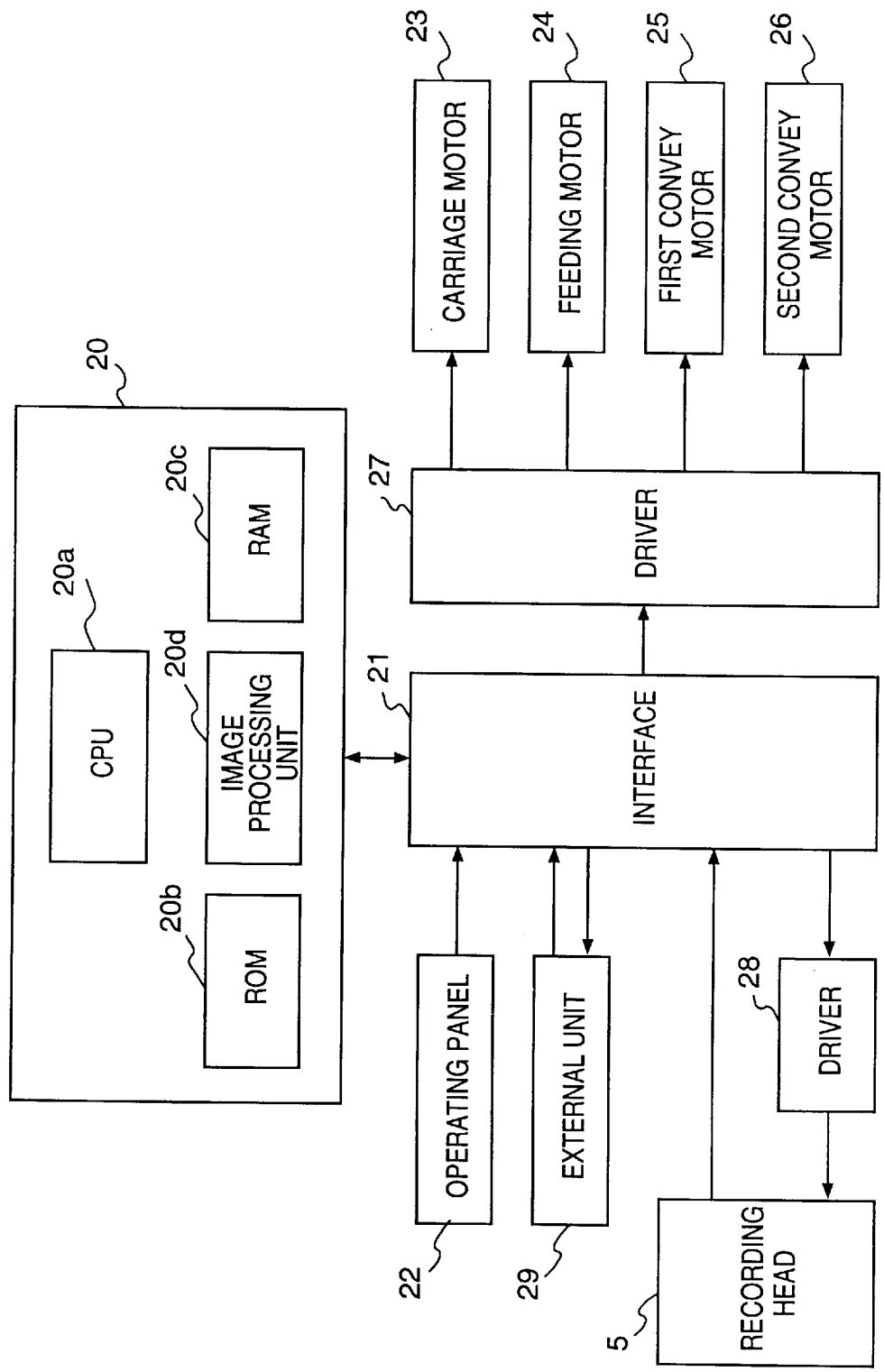
FIG. 2 is a block diagram showing a control system for driving the respective members of the ink-jet printing apparatus.

As shown in FIG. 2, the control system of this embodiment comprises a control unit 20 having a CPU 20a such as a microprocessor, a ROM 20b which stores control programs of the CPU 20a and various data, a RAM 20c which is used as a work area of the CPU 20*a* and temporarily stores various data, and an image processing unit 20*d* (to be described later in detail), and additionally, an interface 21, an operating panel 22, a driver 27 for driving a plurality of motors (the carriage motor 23 for driving the carriage, a feeding motor 24 for driving the feeding rollers, a first convey motor 25 for driving the first convey roller pair 3, and a second convey motor 26 for driving the second convey roller pair 4), and a driver 28 for driving the recording head 5.

With the above arrangement, the control unit 20 receives various information (e.g., a character pitch or character type) from the operating panel 22 through the interface 21, and receives an image signal from an external unit 29. The control unit 20 outputs an ON/OFF signal for driving the motors 23 to 26 and the image signal through the interface 21, so that the respective members are driven in accordance with these signals.

[Image Processing Unit]

The operation of the above image processing unit 20*d* will be described below. In this embodiment, multi-level image data $f(i,j)$ of a pixel of interest is converted into two multi-level data $L(i,j)$ and $R(i,j)$. $L(i,j)$ represents the left pixel of two converted pixels, and $R(i,j)$ represents the right pixel. In addition, i represents a pixel number in the column direction, and j represents a pixel number in the line direction.

Processing performed by the image processing unit 20*d* will be described with reference to FIGS. 8A to 8D. FIG. 8A shows input image data. The input image data is digital data consisting of 8-bit pixels and has a resolution of, e.g., 600 dpi (dot per inch). Each of A to P in FIG. 8A represents data of one pixel.

The input image data shown in FIG. 8A is converted into image data of 1,200 dpi in the main scanning direction. FIG. 8B shows this state. As is apparent from FIG. 8B, one data is used twice.

The image data of 1,200 dpi is subjected to binarization processing executed by a binarization method to be described later. Left and right pixels represented by the same symbol in FIG. 8B are parallelly binarized. FIG. 8C shows the binarization result. FIG. 8D shows a printing result based on the binary data shown in FIG. 8C. The printing unit of this embodiment is constituted by an ink-jet printer which controls ON/Off of dots on the basis of the binary data to form an image.

Figure 3:
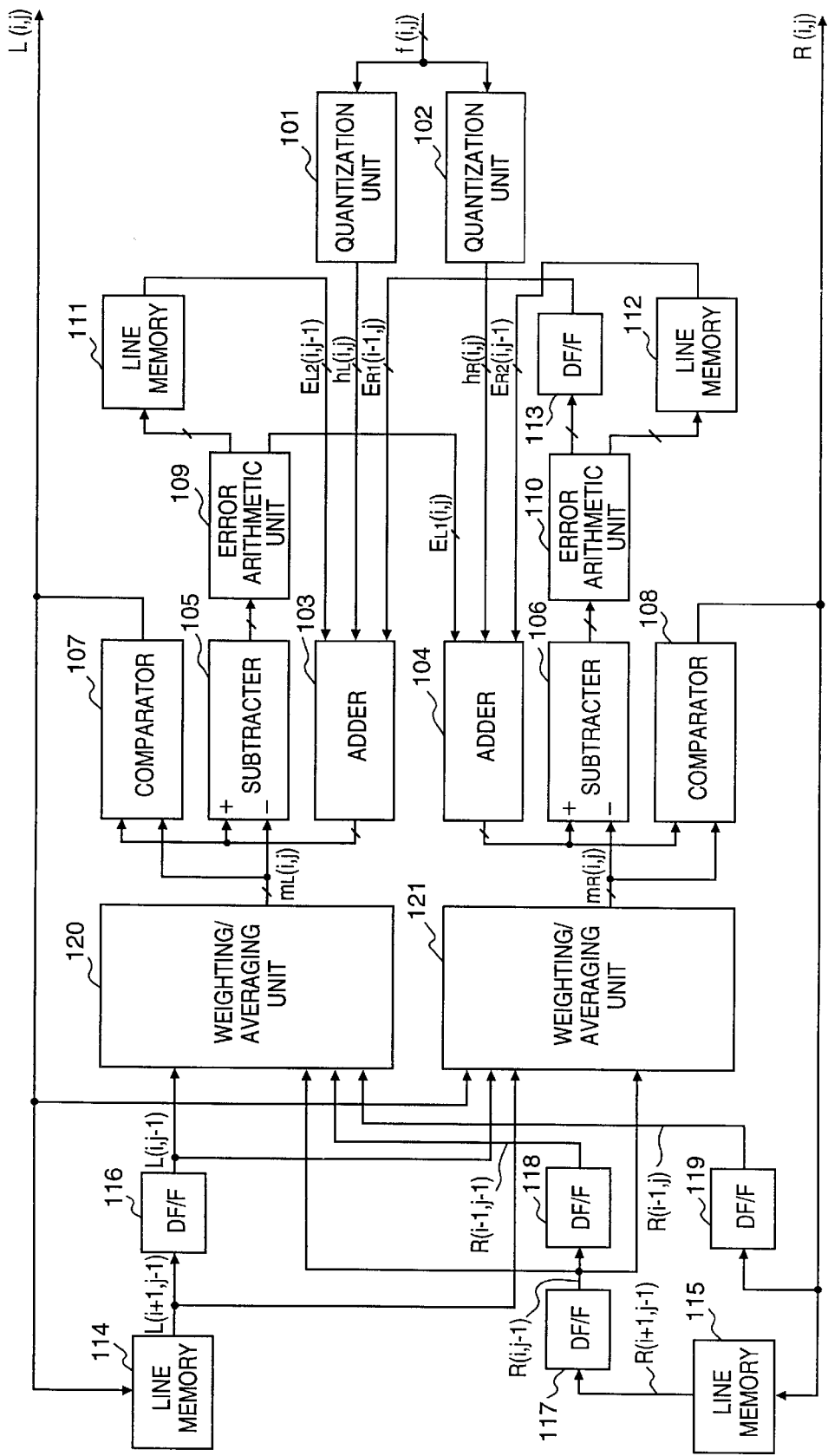
FIG. 3 is a block diagram showing the arrangement of an image processing unit of the first embodiment.

FIG. 3 is a block diagram showing the detailed arrangement of the image processing unit 20*d* of this embodiment.

Referring to FIG. 3, a quantization unit 101 or 102 performs quantization to reduce the data amount of image data. An adder 103 or 104 adds error data for correcting density to the quantized data. A subtracter 105 or 106 calculates the difference between a weighted average value output from a weighting/averaging unit 120 or 121 (to be described later) and the quantized data of a pixel of interest, which is output from the adder 103 or 104. A comparator 107 or 108 compares the weighted average value output from the weighting/averaging unit 120 or 121 with the quantized data of the pixel of interest, which is output from the adder 103 or 104. An error arithmetic unit 109 or 110 outputs an error data value on the basis of the difference between the weighted average value output from the subtracter 105 or 106 and the pixel-of-interest data. A line memory 111 or 112 stores error data of one line.

Each of D-flip-flops (DF/Fs) 113 and 116 to 119 delays the pixel data by one pixel. A line memory 114 or 115 stores the binary image data of one line. The weighting/averaging unit 120 or 121 of an arithmetic unit obtains a weighted average value for a predetermined region from the binary image data in the periphery of the pixel of interest on the basis of internally held predetermined weighting mask data.

An operation of converting the pixel of interest $f(i,j)$ into the two binary pixel data $L(i,j)$ and $R(i,j)$ in the above arrangement will be described below.

Binary data of pixels which have already been binarized before the pixel of interest $f(i,j)$ are stored in the line memories 114 and 115 in advance. When the pixel of interest $f(i,j)$ is to be binarized, the line memory 114 outputs left binary data $L(i+1,j-1)$ about one line ahead, and the line memory 115 outputs right binary data $R(i+1,j-1)$ about one line ahead. The DF/Fs 116 to 119 output data delayed by one pixel. More specifically, the DF/F 116 outputs data $L(i,j-1)$, the DF/F 117 outputs data $R(i,j-1)$, the DF/F 118 outputs data $R(i-1,j-1)$, and the DF/F 119 outputs data $R(i-1,j)$.

These binary data are input to the weighting/averaging units 120 and 121. More specifically, the data $L(i,j-1)$, $R(i,j-1)$, $R(i-1,j-1)$, and $R(i-1,j)$ are input to the weighting/averaging unit 120, and the data $L(i,j)$, $L(i,j-1)$, $L(i+1,j-1)$, and $R(i,j-1)$ are input to the weighting/averaging unit 121. The weighting/averaging units 120 and 121 calculate weighted average density values $m_L(i,j)$ and $m_r(i,j)$ from the binary data near the pixel of interest on the basis of the weighting mask shown in FIG. 4.

Weighting calculation by the weighting/averaging units 120 and 121 will be described. In the weighting mask shown in FIG. 4, a hatched portion represents a pixel-of-interest position, and M(1) to M(4) are weighting coefficients representing the weighting ratio for the four peripheral pixels of the pixel of interest.

Figure 4:
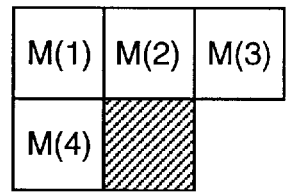
FIG. 4 is a view showing an example of a weighting mask used in the first embodiment.
Figure 5A:
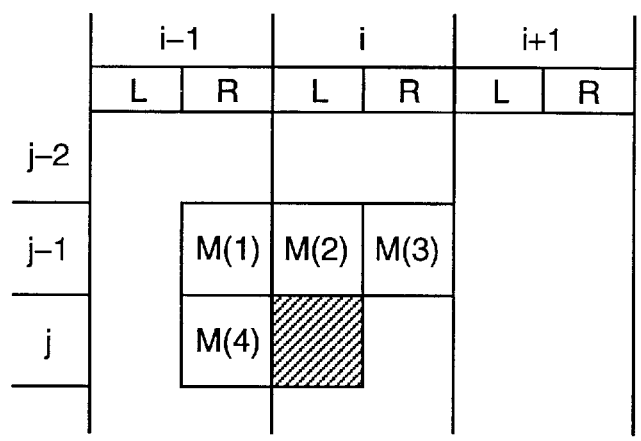
FIGS. 5A and 5B are views for explaining an application example of the weighting mask of the first embodiment to peripheral pixels.
Figure 5B:
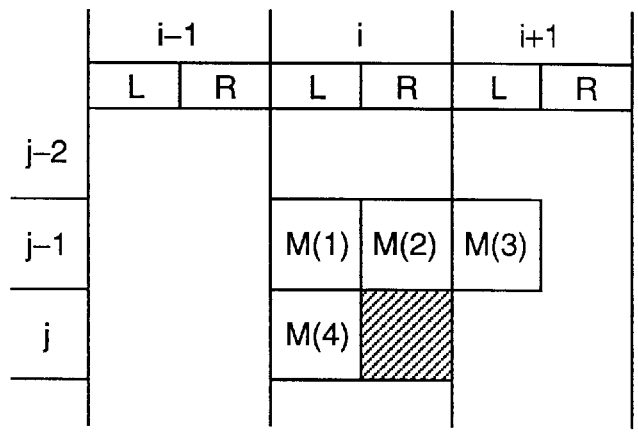

FIGS. 5A and 5B show weighting processing. Referring to FIGS. 5A and 5B, each pixel is divided into a left pixel (L) and a right pixel (R) along the column direction (i direction). The weighting mask shown in FIG. 4 is applied while regarding the pixel after division as one pixel. FIG. 5A shows an example of a weighting mask applied to the left pixel of two pixels obtained upon dividing the pixel of interest, which is applied to calculation by the weighting/averaging unit 120. More specifically, the weighted average density value $m_L(i,j)$ obtained by the weighting/averaging unit 120 is calculated on the basis of the following equation:

$$m_L(i,j)=M(1)\times R(i-1,j-1)+M(2)\times L(i,j-1)+M(3)\times R(i,j-1)+M(4)\times R(i-1,j)$$

where $\Sigma M(k)=1$

Similarly, FIG. 5B shows an example of a weighting mask applied to the right pixel of two pixels obtained upon dividing the pixel of interest, which is applied to calculation by the weighting/averaging unit 121. More specifically, the weighted average density value $m_R(i,j)$ obtained by the weighting/averaging unit 121 is calculated on the basis of the following equation:

$$m_R(i,j)=M(1)\times L(i,j-1)+M(2)\times R(i,j-1)+M(3)\times L(i+1,j-1)+M(4)\times L(i,j)$$

where $\Sigma M(k)=1$

When the pixel of interest is the leftmost pixel of the line, M(1) and M(4) are set to be zero in calculation of the value $m_L(i,j)$. When the pixel of interest is the rightmost pixel of the line, M(3) is set to be zero in calculation of the value in $m_R(i,j)$. In addition, when the values $m_L(i,j)$ and $m_R(i,j)$ of the pixels of the first line are to be calculated, M(1) to M(3) are set to be zero, or the calculation result of the term including any one of M(1) to M(3) is set to zero.

The weighted average density values $m_L(i,j)$ and $m_R(i,j)$ obtained in the above-described manner are input to the subtracters 105 and 106 and the comparators 107 and 108 in FIG. 3, respectively.

On the other hand, the multi-level data $f(i,j)$ of the pixel of interest is input to the quantization units 101 and 102. Quantization processing by the quantization units 101 and 102 will be described below.

FIG. 6 is a block diagram showing the detailed arrangement of the quantization unit 101. The quantization unit 102 has the same arrangement as that of the quantization unit 101, and only the arrangement of the quantization unit 101 will be described below.

Referring to FIG. 6, a divider 201 divides 8-bit multi-level image data into upper 4-bit data and lower 4-bit data. A random number generator 202 generates a random number in units of pixels. A comparator 203 binarizes the lower bit data divided by the divider 201 by using the random number value generated by the random number generator 202 as a threshold value. An adder 204 adds the lower bit data binarized by the comparator 203 to the upper bit data divided by the divider 201 and outputs the data as quantized data.

Quantization processing by the quantization unit 101 having the arrangement shown in FIG. 6 will be described below.

The divider 201 divides 8-bit multi-level data into upper 4-bit data and lower 4-bit data. The lower 4-bit data is input to the comparator 203 together with a random number value generated by the random number generator 202 in units of pixels. The comparator 203 compares the lower 4-bit data with the random number value, thereby binarizing the lower 4-bit data. The binarized lower bit data is added to the upper 4-bit data by the adder 204, so that quantized data $h(i,j)$ whose number of bits is reduced is output.

The quantization unit 102 performs similar quantization processing, so that quantized data $h(i,j)$ is output. The quantized data output from the quantization unit 101 will be represented as $h_L(i,j)$, and the quantized data output from the quantization unit 102 will be represented as $h_R(i,j)$ hereinafter.

The quantized data $h_L(i,j)$ is input to the adder 103. The adder 103 adds error correction data $E_{R1}(i-1,j)$ and $E_{L2}(i,j-1)$ (to be described later) to the quantized data $h_L(i,j)$ of the pixel of interest and outputs a value $h_L(i,j)+E_{R1}(i-1,j)+E_{L2}(i,j-1)$.

The subtracter 105 calculates the difference between the value $h_L(i,j)+E_{R1}(i-1,j)+E_{L2}(i,j-1)$ output from the adder 103 and the value $m_L(i,j)$ output from the weighting/averaging unit 120. The comparator 107 compares the value $h_L(i,j)+E_{R1}(i-1,j)+E_{L2}(i,j-1)$ output from the adder 103 with the value $m_L(i,j)$ output from the weighting/averaging unit 120 and outputs the binary data $L(i,j)$ corresponding to the left pixel obtained upon dividing the pixel of interest $f(i,j)$.

The binary data $L(i,j)$ obtained in the above manner is sent to the output unit such as a binary printer as data after quantization, and at the same time, input to the line memory 114 as peripheral pixel information for subsequent binarization and held.

A value $h_L(i,j)+E_{R1}(i-1,j)+E_{L2}(i,j-1)-m_L(i,j)$ output from the subtracter 105 is input to the error arithmetic unit 109. The error arithmetic unit 109 outputs error correction data $E_{L1}(i,j)$ and $E_{L2}(i,j)$ in accordance with the following equation:

$$E_{L1}(i,j)=E_{L2}(i,j)=\{h_L(i,j)+E_{R1}(i-1,j)+E_{L2}(i,j-1)-M_L(i,j)\}/2$$

The error correction data $E_{L1}(i,j)$ is applied to the right pixel of the pixel of interest $f(i,j)$. The error correction data $E_{L2}(i,j)$ is stored in the line memory 111 and applied to a pixel $f(i,j+1)$ one line after the pixel of interest. When the error arithmetic unit 109 is constituted by a ROM, and an arithmetic output value corresponding to an input value from the subtracter 105 is held as a table in advance, the processing speed can be increased.

Therefore, the error correction data assigned to the left pixel of two pixels obtained upon dividing the pixel of interest $f(i,j)$ consists of the error $E_{R1}(i,j-1)$ generated upon binarizing the right pixel of a pixel $f(i-1,j)$ one pixel ahead of the pixel of interest, and the error $E_{L2}(i,j-1)$ generated upon binarizing the left pixel of a pixel $f(i,j-1)$ one line ahead of the pixel of interest.

Similarly, the right quantized data $h_R(i,j)$ is input to the adder 104. The adder 104 adds the error correction data $E_{L1}(i,j)$ and $E_{R2}(i,j-1)$ (to be described later) to the quantized data $h_R(i,j)$ of the pixel of interest and outputs a value $h_R(i,i)+E_{L1}(i,j)+E_{R2}(i,j-1)$.

The subtracter 106 calculates the difference between the value $h_R(i,j)+E_{L1}(i,j)+E_{R2}(i,j-1)$ output from the adder 104 and the value $m_R(i,j)$ output from the weighting/averaging unit 121. The comparator 108 compares the value $h_R(i,j)+E_{L1}(i,j)+E_{R2}(i,j-1)$ output from the adder 104 with the value $m_R(i,j)$ output from the weighting/averaging unit 121 and outputs the binary data $R(i,j)$ corresponding to the right pixel obtained upon dividing the pixel of interest $f(i,j)$.

The binary data $R(i,j)$ obtained in the above manner is sent to the output unit such as a binary printer as data after quantization, and at the same time, input to the line memory 115 and the DF/F 119 as peripheral pixel information for subsequent binarization and held.

A value $h_R(i,j)+E_{L1}(i,j)+E_{R2}(i,j-1)-m_R(i,j)$ output from the subtracter 106 is input to the error arithmetic unit 110. The error arithmetic unit 110 outputs error correction data $E_{R1}(i,j)$ and $E_{R2}(i,j)$ in accordance with the following equation:

$$\begin{aligned}E_{R1}(i,j) &= E_{R2}(i,j)\\ &= \{h_R(i,j)+E_{L1}(i,j)+E_{R2}(i,j-1)-m_R(i,j)\}/2\end{aligned}$$

The error correction data $E_{R1}(i,j)$ is input to the DF/F 113 and applied to the left pixel of a pixel $f(i+1,j)$ subsequent to the pixel of interest $f(i,j)$. The error correction data $E_{R2}(i,j)$ is stored in the line memory 112 and assigned to the pixel $f(i,j+1)$ one line after the pixel of interest.

Therefore, the error correction data applied to the right pixel of two pixels obtained upon dividing the pixel of interest $f(i,j)$ consists of the error $E_{L1}(i,j)$ generated upon binarizing the left pixel of the pixel of interest $f(i,j)$, and the error $E_{R2}(i,j-1)$ generated upon binarizing the right pixel of the pixel $f(i,j-1)$ one line ahead of the pixel of interest.

As described above, binarization processing of the left pixel and binarization processing of the right pixel are parallelly executed. With this processing, a binarization result with a resolution twice as high as that of the input multi-level image data can be obtained.

Figure 9:
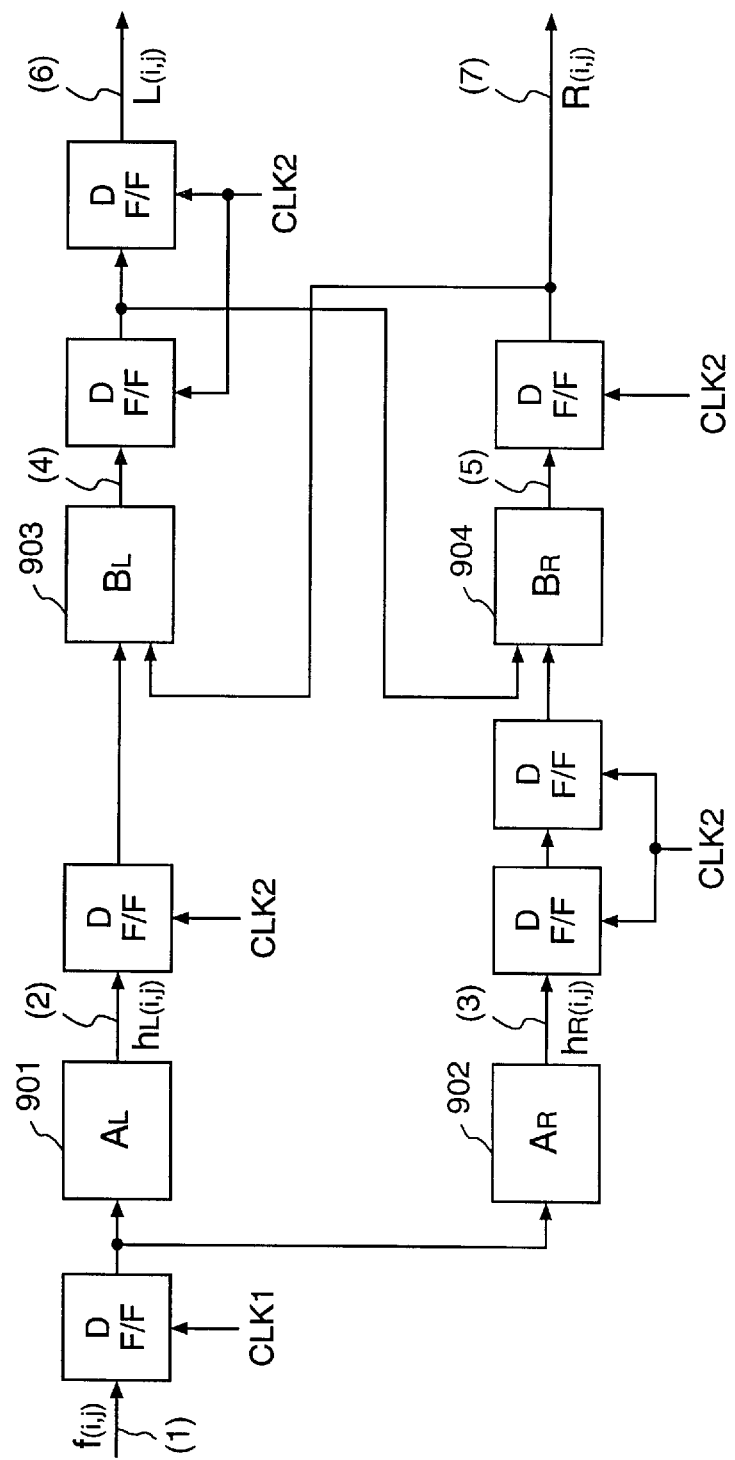
FIG. 9 is a block diagram showing the simple arrangement of the image processing unit shown in FIG. 3.

FIG. 9 is a block diagram showing the simple arrangement of FIG. 3 to explain the processing timing in FIG. 3.

An $A_L$ 901 corresponds to the quantization unit 101 shown in FIG. 3. An $A_R$ 902 corresponds to the quantization unit 102 shown in FIG. 3. A $B_L$ 903 corresponds to the adder 103, the subtracter 105, the comparator 107, the error arithmetic unit 109, the line memory 111, and the weighting/averaging unit 120 shown in FIG. 3. A $B_R$ 904 corresponds to the adder 104, the subtracter 106, the comparator 108, the error arithmetic unit 110, the line memory 112, the DF/F 113, and the weighting/averaging unit 121 shown in FIG. 3.

Reference symbol CLK1 denotes a clock for 600 dpi; and CLK2, a clock for 1,200 dpi.

Figure 10:
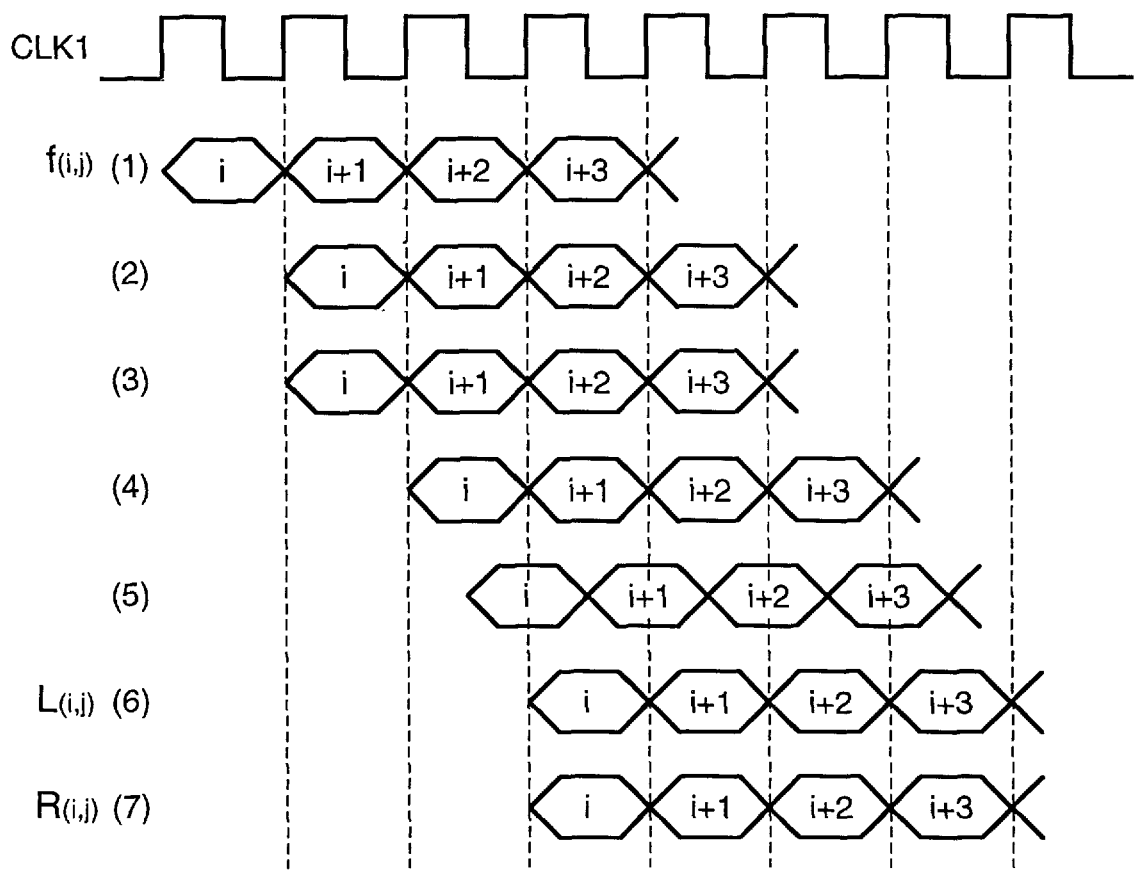
FIG. 10 is a timing chart for various portions shown in FIG. 9.

FIG. 10 is a timing chart of the circuit shown in FIG. 9, which shows the timings of signals at portions (1) to (7) in FIG. 9. At timing (1), input data of 600 dpi is input. The input data of 600 dpi is converted into two quantized data at timings (2) and (3). The two quantized data are shifted from each other by ½ the clock for 600 dpi from timing (2) to timing (4) and from timing (3) to timing (5), respectively. With this operation, error correction from the left pixel to the right pixel and error correction from the right pixel to the left pixel are executed. From timing (4) to timing (6), and from timing (5) to timing (7), the data L(i,j) and R(i,j) are synchronized with each other, and the respective binarization results are output.

As described above, according to this embodiment, the series of processing operations in units of pixels are performed for all input multi-level pixels. With this processing, the multi-level image data after quantization is binarized in accordance with appropriate weighted average values of the peripheral pixels, so that binary image data corresponding to twice the number of pixels (resolution) can be obtained while appropriately reflecting the error generated upon binarization. That is, with a simple and inexpensive circuit arrangement, a binary image which realizes excellent gradation characteristics without any pseudo-contour, and a high resolution can be obtained. Binarization processing of this embodiment is applicable to a color image in units of color components, as a matter of course.

In this embodiment, one pixel is divided into two pixels. However, the present invention is not limited to this embodiment and can also be applied when one pixel is divided into three or more pixels and output.

Second Embodiment

The second embodiment of the present invention will be described below.

An image processing apparatus of the second embodiment has the same arrangement as that of the above-described first embodiment, except for the detailed arrangement of the quantization units 101 and 102 shown in FIG. 3. In the second embodiment, the threshold value for binarization of lower 4-bit data for reducing the number of bits is switched between a random number and a signal based on a dither matrix.

FIG. 7 is a block diagram showing the detailed arrangement of quantization units 101 and 102 of the second embodiment.

Referring to FIG. 7, a divider 401 divides 8-bit multi-level image data into upper 4-bit data and lower 4-bit data. A random number generator 402 generates a random number in units of pixels. A dither signal generator 403 generates a dither signal in accordance with a predetermined dither matrix. A selector 404 selects, as a threshold value, the random number or the dither signal in accordance with the value of the upper 4-bit signal divided by the divider 401. A comparator 405 binarizes the lower 4-bit data divided by the divider 401 on the basis of the threshold value output from the selector 404. An adder 406 adds the lower bit data binarized by the comparator 405 to the upper 4-bit data divided by the divider 401 and outputs quantized data.

Quantization of an 8-bit image signal by the quantization units 101 and 102 having the above arrangement will be described below.

Multi-level image data is input to the divider 401 and divided into upper 4-bit data and lower 4-bit data. On the other hand, the random number generator 402 generates a random number, and the dither signal generator generates a dither signal on the basis of a predetermined dither matrix in units of pixels. The random number and the dither signal are input to the selector 404. The upper 4-bit signal divided by the divider 401 is input to the selector 404 as a selection signal. The selector 404 selects, as a threshold value, the random number or the dither signal in accordance with the selection signal.

Assume that dots are output at a predetermined period. In this case, the random number is effectively selected for a highlight region where dot connection is conspicuous or a high-density region where dots are dense so that a texture or Moiré is distinctive, and the dither signal is effectively selected for a low-density region where the dot density results in roughness.

The threshold value selected by the selector 404 is input to the comparator 405. The comparator 405 binarizes the lower bit data on the basis of the threshold value. The binarized lower bit data is added to the upper bit data by the adder 406 and output.

In the second embodiment, quantization processing for reducing the number of bits is realized in the above-described manner. The subsequent processing is the same as that described in the first embodiment, and a detailed description thereof will be omitted.

As described above, according to the second embodiment, a threshold value based on a dither matrix can also be selected in the arrangement of the quantization units 101 and 102, so that a more excellent image unnoticeable in roughness or texture can be obtained by quantization.

In the above-described first and second embodiments, the quantization units 101 and 102 are independently arranged. However, the quantization units 101 and 102 may be integrated into one arrangement. More specifically, the quantized data h(i,j) output from one quantization unit may be input to the adders 103 and 104 as the quantized data $h_L(i,j)$ and $h_R(i,j)$, respectively.

As described above, according to this embodiment, even when multi-level image data is input, and one pixel of the image data is converted into a plurality of pixels of binary data, the multi-level image data after quantization is binarized in accordance with appropriate weighted average values of the peripheral pixels, so that binary image data whose number of pixels is twice can be obtained while appropriately reflecting the error generated upon binarization. That is, a binary image having a high resolution and high gradation can be obtained at a low cost.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting multi-level image data;
   producing means for producing a plurality of multi-level image data having a level the same as that of the input multi-level image data from multi-level image data of one pixel by repeatedly using the input multi-level data;
   first and second converting means for converting each of the plurality of multi-level image data produced by said producing means into binary data; and
   control means for controlling said first and second converting means to parallelly execute conversion processing,
   wherein said first and second converting means convert the produced multi-level image data into the binary data using the same binarizing method.

2. The apparatus according to claim 1, wherein said first and second converting means include converting means for correcting error data generated upon converting the multi-level image data into the binary data.

3. The apparatus according to claim 1, wherein said first and second converting means convert the multi-level image data into the binary data by using binary data which has already been converted.

4. An image processing method comprising the steps of:
inputting multi-level image data;
producing a plurality of multi-level image data having a level the same as that of the input multi-level image data from multi-level image data of one pixel by repeatedly using the input multi-level data;
converting the plurality of multi-level image data produced in said producing step into plural binary data, respectively; and
controlling to parallelly execute conversion processes in said converting step, which correspond to each of the plurality of multi-level image data, so that the conversion processes use the same binarization methods.

5. The method according to claim 4, wherein said converting step includes executing a correcting process which corrects error data generated upon converting the multi-level image data into the binary data.

6. The method according to claim 4, wherein, in said converting step, the multi-level image data is converted into the binary data by using binary data which has already been converted.

7. An image processing apparatus for converting one pixel of multi-level data into a plurality of pixels of binary data, comprising:
quantization means for reducing a number of bits per pixel of input multi-level image data;
error addition means for adding a plurality of error components to image data whose number of bits is reduced by said quantization means;
holding means for holding data of a plurality of pixels which have already been binarized;
averaging means for obtaining a weighted average value of the binary data of the plurality of pixels near a pixel of interest, which value is held in said holding means;
pixel generation means for binarizing, on the basis of the weighted average value, the image data to which the plurality of error components are to be added to generate binary data of a plurality of pixels in correspondence with a pixel of the multi-level image data; and
error generation means for generating the plurality of error components on the basis of a difference between the weighted average value and a value of the image data to which the plurality of error components are to be added,
wherein said quantization means, said averaging means, said pixel generation means, and said error generation means comprise at least two quantization means, two averaging means, two pixel generation means, and two error generation means, respectively, and processing operations by at least two systems are parallelly performed.

8. The apparatus according to claim 7, wherein said quantization means reduces the number of bits by binarizing lower bits of the multi-level image data.

9. The apparatus according to claim 7, wherein said quantization means comprising:
random number generation means for generating a random number in units of pixels;
binarization means for binarizing lower bits of the multi-level data of the pixel of interest on the basis of the random number generated by said random number generation means; and
addition means for adding the lower bits binarized by said binarization means to upper bits of the multi-level data of the pixel of interest.

10. The apparatus according to claim 7, wherein said quantization means comprising:
random number generation means for generating a random number in units of pixels;
threshold value generation means for generating a threshold value according to a predetermined dither matrix;
selection means for selecting, on the basis of upper bits of the multi-level data of the pixel of interest, one of the random number generated by said random number generation means and the threshold value generated by said threshold value generation means;
binarization means for binarizing lower bits of the multi-level data of the pixel of interest on the basis of the random number or the threshold value selected by said selection means; and
addition means for adding the lower bits binarized by said binarization means to the upper bits of the pixel of interest.

11. The apparatus according to claim 7, wherein said at least two averaging means and two error generation means mutually transfer information between said two systems.

12. An image processing apparatus for dividing one pixel of multi-level data into a plurality of pixels of binary data, comprising:
first and second quantization means for reducing the number of bits per pixel of the input multi-level image data;
first and second error addition means for adding first and second error components to the image data whose number of bits are reduced by said first and second quantization means;
holding means for holding binary data of a plurality of pixels which have already been divided;
first and second averaging means for obtaining weighted average values of the binary data of the plurality of pixels near a pixel of interest, which value is held in said holding means;
first pixel generation means for binarizing, on the basis of the first weighted average value obtained by said first averaging means, the image data output from said first error addition means to obtain a first pixel after division;
second pixel generation means for binarizing, on the basis of the second weighted average value obtained by said second averaging means, the image data output from said second error addition means to obtain a second pixel after division; and
first and second error generation means for generating the first and second error components on the basis of differences between values of the image data output from said first and second error addition means and the first and second weighted average values, respectively.

13. The apparatus according to claim 12, wherein each of said first and second quantization means reduces the number of bits by binarizing lower bits of the multi-level image data.

14. The apparatus according to claim 12, wherein each of said first and second quantization means comprising:
random number generation means for generating a random number in units of pixels;

binarization means for binarizing lower bits of the multi-level data of the pixel of interest on the basis of the random number generated by said random number generation means; and addition means for adding the lower bits binarized by said binarization means to upper bits of the multi-level data of the pixel of interest.

15. The apparatus according to claim 12, wherein each of said first and second quantization means comprising:

random number generation means for generating a random number in units of pixels;

threshold value generation means for generating a threshold value according to a predetermined dither matrix;

selection means for selecting, on the basis of upper bits of the multi-level data of the pixel of interest, one of the random number generated by said random number generation means and the threshold value generated by said threshold value generation means;

binarization means for binarizing lower bits of the multi-level data of the pixel of interest on the basis of the random number of the threshold value selected by said selection means; and addition means for adding the lower bits binarized by said binarization means to the upper bits of the pixel of interest.

16. The apparatus according to claim 12, wherein the first error component is an error generated upon binarization processing by said first pixel generation means, and the second error component is an error generated upon binarization processing by said second pixel generation means.

17. The apparatus according to claim 16, wherein said first error addition means adds the first error component generated upon generating said first pixel after division one line ahead of the pixel of interest and the second error component generated upon generating said second pixel after division immediately before the pixel of interest to the image data whose number of bits is reduced by said first quantization means, and said second error addition means adds the first error component generated upon generating said first pixel after division immediately before the pixel of interest and the second error component generated upon generating said second pixel after division one line ahead of the pixel of interest to the image data whose number of bits is reduced by said second quantization means.

18. The apparatus according to claim 12, wherein said first averaging means obtains weighted average values of binary data of a plurality of pixels one line ahead of and adjacent to the pixel of interest and said second pixel after division immediately before the pixel of interest, and said second averaging means obtains weighted average values of binary data of a plurality of pixels one line ahead of and adjacent to the pixel of interest and said first pixel after division immediately before the pixel of interest.

19. An image processing method of converting one pixel of multi-level data into a plurality of pixels of binary data, comprising the steps of:

reducing a number of bits per pixel of input multi-level image data;

adding a plurality of error components to image data whose number of bits is reduced in said reducing step;

obtaining a weighted average value of binary data of a plurality of pixels near a pixel of interest, which value is held in a memory which stores binary data of the plurality of pixels which have already been binarized;

binarizing, on the basis of the weighted average value, the image data to which the plurality of error components were added to generate binary data of the plurality of pixels in correspondence with a pixel of the multi-level image data; and generating the plurality of error components on the basis of a difference between the weighted average value and value of the image data to which the plurality of error components were added, wherein, in said reducing step, said obtaining step, said binarizing step, and said generating step, respectively, at least two reducing processes, two averaging processes, two binarizing processes, and two generating processes are parallelly performed in at least two systems.

20. An image processing method of dividing one pixel of multi-level data into a plurality of pixels of binary data, comprising the steps of:

reducing a number of bits per pixel of input multi-level image data to produce first and second image data;

adding first and second error components to the first and second image data, respectively;

obtaining first and second weighted average values of binary data of a plurality of pixels near a pixel of interest, which value is held in a memory which holds binary data of the plurality of pixels which have already been divided;

binarizing, on the basis of the first weighted average value obtained in said averaging step, the first image data added with the first error component to obtain binary data of a first pixel after division;

binarizing, on the basis of the second weighted average value obtained in said averaging step, the second image data added with the second error component to obtain binary data of a second pixel after division; and generating the first and second error components on the basis of differences between values of the first and second image data added with the first and second error components, respectively, and the first and second weighted average values, respectively.

* * * * *

UNITED STATES PATENT AND TRADEMARK OFFICE
CERTIFICATE OF CORRECTION

PATENT NO. : 5,884,011

DATED : March 16, 1999

INVENTOR(S) : SEITA SHONO

It is certified that error appears in the above-identified patent and that said Letters Patent is hereby corrected as shown below:

COLUMN 2 line 35, "predetermine" should read --predetermined--.

COLUMN 3 line 45, "ON/Off" should read --ON/OFF--.

COLUMN 6 line 17, "$h_r(i,i)$" should read --$h_r(i,j)$--.

COLUMN 8 line 42, "twice can" should read --twice, can--.

Signed and Sealed this

Ninth Day of November, 1999

Attest:

Q. TODD DICKINSON

*Attesting Officer*    *Acting Commissioner of Patents and Trademarks*